US011404975B2

(12) United States Patent
Krause-Leipoldt

(10) Patent No.: US 11,404,975 B2
(45) Date of Patent: Aug. 2, 2022

(54) ELECTRONIC CONTROL SYSTEM FOR A FREQUENCY CONVERTER WITH A USE VALUE

(71) Applicant: Siemens Aktiengesellschaft, Munich (DE)

(72) Inventor: Tammo Krause-Leipoldt, Baiersdorf (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 17/262,560

(22) PCT Filed: Jul. 8, 2019

(86) PCT No.: PCT/EP2019/068207
§ 371 (c)(1),
(2) Date: Jan. 22, 2021

(87) PCT Pub. No.: WO2020/020610
PCT Pub. Date: Jan. 30, 2020

(65) Prior Publication Data
US 2021/0313907 A1    Oct. 7, 2021

(30) Foreign Application Priority Data
Jul. 25, 2018   (EP) ..................... 18185499

(51) Int. Cl.
*H02P 6/04* (2016.01)
*H02M 7/5387* (2007.01)
*H02P 27/06* (2006.01)

(52) U.S. Cl.
CPC .......... *H02M 7/53873* (2013.01); *H02P 6/04* (2013.01); *H02P 27/06* (2013.01)

(58) Field of Classification Search
CPC ........ H02M 7/53873; H02P 27/06; H02P 6/04
See application file for complete search history.

(56) References Cited

U.S. PATENT DOCUMENTS 6,555,984 B1 * 4/2003 Rajala ..................... H02K 5/22
318/567
7,865,649 B2 * 1/2011 Kram ................ G05B 19/0423
710/305
(Continued)

FOREIGN PATENT DOCUMENTS

CN       203014737 U    6/2013
CN       103475279 A   12/2013
(Continued)

OTHER PUBLICATIONS

N et al: "Dynamic Partial Reconfiguration Contribution on System on Programmable Chip Architecture for Motor Drive Implementation", American Journal of Engineering and Applied Sciences, pp. 15-24, XP055547564, DOI: 10.3844/ajeassp.2012.15.24; Glefunden im Internet: URL:https://thescipub.com/pdf/10.3844/ajeassp.2012.15.24;[gefunden am Jan. 25, 2019], pp. 3,5; 2012.
(Continued)

*Primary Examiner* — Rina I Duda
(74) *Attorney, Agent, or Firm* — Henry M. Feiereisen LLC

(57) ABSTRACT

An electronic control system of a frequency converter repeatedly receives one nominal base value at a time for the operation of an electrical machine, determines a respective nominal current value using the respective nominal base value, and determines respective control signals for power semiconductors of the frequency converter using the respective nominal current value. The electronic control system controls the power semiconductors according to the determined respective control signals and thereby supplies the electrical machine with electrical energy such that the electrical machine is operated according to the nominal base value. The electronic control system determines the respective nominal current value and/or the respective control signals according to an enabled determination method if and
(Continued)

as long as a permissible extent of use for the enabled determination method is larger than 0.

13 Claims, 7 Drawing Sheets

(56) References Cited

U.S. PATENT DOCUMENTS

| | | | | |
|---|---|---|---|---|
| 8,179,077 | B2* | 5/2012 | Kangas | H02P 29/00 318/632 |
| 8,183,809 | B2* | 5/2012 | Kram | H02P 6/04 318/452 |
| 2002/0161492 | A1* | 10/2002 | Eckardt | G05B 23/0235 701/22 |
| 2009/0094396 | A1* | 4/2009 | Kram | G05B 19/4069 710/104 |
| 2010/0001676 | A1 | 1/2010 | Kram et al. | |
| 2010/0005473 | A1 | 1/2010 | Blanding et al. | |
| 2011/0288992 | A1 | 11/2011 | Macharg et al. | |
| 2012/0232714 | A1 | 9/2012 | Ricket | |
| 2013/0235618 | A1* | 9/2013 | Dillig | H02H 7/1216 363/16 |
| 2013/0340051 | A1 | 12/2013 | Gangaraj Manoharan et al. | |
| 2015/0214873 | A1* | 7/2015 | Ritz | H02M 7/5387 318/400.06 |

FOREIGN PATENT DOCUMENTS

| | | |
|---|---|---|
| CN | 105743118 A | 7/2016 |
| CN | 106549620 A | 3/2017 |
| CN | 107547032 A | 1/2018 |
| DE | 102006059708 A1 | 6/2008 |
| EP | 0801836 A2 | 10/1997 |
| JP | 2008141823 A | 6/2008 |

OTHER PUBLICATIONS

Jozsef Vasarhelyi et al: "Run-Time Reconfiguration of Tandem Inverter for Induction Motor Drives", Power Electronics and Motion Control Conference, 2006. EPE-PEMC 2006. 12th International, pp. 408-413, XP055547615, Piscataway, NJ, USA; DOI: 10.1109/EPEPEMC.2006.4778435 ISBN: 978-1-4244-0121-5; pp. 4, 5; 2006.
PCT International Preliminary Examination Report and Written Opinion of International Examination Authority dated Mar. 7, 2020 corresponding to PCT International Application No. PCT/EP2019I068207 filed Aug. 7, 2019.

* cited by examiner

ELECTRONIC CONTROL SYSTEM FOR A FREQUENCY CONVERTER WITH A USE VALUE

CROSS-REFERENCES TO RELATED APPLICATIONS

This application is the U.S. National Stage of International Application No. PCT/EP2019/068207, filed Jul. 8, 2019, which designated the United States and has been published as International Publication No. WO 2020/020610 A1 and which claims the priority of European Patent Application, Serial No. 18185499.3, filed Jul. 25, 2018, pursuant to 35 U.S.C. 119(a)-(d).

BACKGROUND OF THE INVENTION

The present invention is based on an operating method for a frequency converter,
wherein an electronic control system of a frequency converter repeatedly receives one nominal base value at a time for the operation of an electric machine supplied with electrical energy by means of the frequency converter, determines a respective nominal current value using the respective nominal base value, determines respective control signals for power semiconductors of the frequency converter using the respective nominal current value, and actuates the power semiconductors in accordance with the determined respective control signals and as a result supplies electrical energy to the electric machine so that the electric machine is operated as far as possible according to the nominal base value,
wherein the electronic control system determines the respective nominal base value and/or the respective control signals according to a determination method.

The present invention is further based on a control program for an electronic control system of a frequency converter, wherein the control program comprises machine code which can be processed by the electronic control system, wherein the processing of the machine code by the electronic control system causes the electronic control system to carry out such an operating method.

The present invention is further based on an electronic control system of a frequency converter, wherein the electronic control system is programmed with a control program of this type, so that the processing of the machine code by the electronic control system causes the electronic control system to carry out such an operating method.

The present invention is further based on a frequency converter, wherein the frequency converter has semiconductors, by way of which an electric machine is supplied with electrical energy, wherein the frequency converter has an electronic control system of this type which actuates the power semiconductors.

Frequency converters are known in many different embodiments. Different functionalities and performance features can be realized depending on the frequency converter. In the prior art the functionalities and performance features are implemented within the respective frequency converter, more precisely within its electronic control system. They can be called up and used by the user as and when required or not called up and thus remain unused. A subsequent expansion or in general subsequent adjustment of the functionalities and the performance features depending on the current needs of the user is conversely not possible.

In practice this results in the user of a frequency converter already having to know very precisely, upon acquisition of the frequency converter, which functionalities and performance features he requires. For this reason many different frequency converters often exist, which do not differ or only differ marginally in terms of hardware but bring about an enormous variation for the manufacturer of the frequency converter. Moreover, they often make it harder for the user to select the frequency converter suitable for him. In particular, the user has to decide whether, upon acquisition of the frequency converter, he acquires a currently overdimensioned product so that an expansion reserve is available to him with subsequent changes to the requirements on the frequency converter or whether he only acquires a product which satisfies his current requirement so that at a later date he has to acquire a new product if there is a change in requirements.

DE 10 2006 059 708 A1 discloses an operating method for a frequency converter. The frequency converter can be formed from a combination of a motor control device and an electric drive unit. The motor control device in each case receives a nominal base value for the operation of an electric machine supplied with electrical energy by way of the frequency converter and by using the respective nominal base value determines a respective nominal current value. The associated drive unit determines respective control signals for power semiconductors using the respective nominal current value and actuates the power semiconductors in accordance with the determined respective control signals. As a result, the electric machine is supplied with electrical energy so that the electric machine is operated as far as possible in accordance with the nominal base value. The electronic control system determines the respective nominal current value and/or the respective control signals according to a determination method. Within the scope of this operating method, what is known as monitoring operation is possible. In the monitoring operation the electronic control system checks whether an actual value condition is complied with. If the condition is complied with, the control signals are output to the electric machine. Otherwise the electric machine is separated from the power supply. The actual value condition can be a dynamic condition. For instance, the speed can be compared with a maximum permissible rotational speed, wherein the maximum permissible rotational speed is gradually reduced from an initial value to an end value. The initial value is that rotational speed which the electric machine has at the point in time at which a transition is made into the monitoring operation. The end value can have the value 0.

The scientific paper "Dynamic Partial Reconfiguration Contribution on System on Programmable Chip Architecture for Motor Drive Implementation" by Hedi Abdelkrim et al., published in American Journal of Engineering and Applied Sciences, volume 5(1), 2012, pages 15 to 24 discloses a motor drive which can be reconfigured dynamically.

The scientific paper "RUN-TIME RECONFIGURATION TANDEM INVERTER USED IN INDUCTION MOTOR DRIVES" by J. Vasarhelyi et al., POWER ELECTRONICS AND MOTION CONTROL CONFERENCE, 2006, pages 408 to 413, discloses a frequency converter which can be reconfigured dynamically.

The object of the present invention consists in creating possibilities, by means of which it is possible, anytime, also subsequently, to be able to adjust the functional scope of the frequency converter as required. In this context, the legitimate interests of the manufacturer of the frequency converter are in particular also to be taken into account.

SUMMARY OF THE INVENTION

The object is achieved by an operating method for an electric machine powered by way of a frequency converter as set forth hereinafter. Advantageous embodiments of the operating method form the subject matter of the dependent claims.

In accordance with the invention, an operating method of the type cited in the introduction is embodied in that the electronic control system only then determines the respective nominal current value and/or the respective control signals according to the determination method if and as long as a permissible extent of use for the determination method is greater than 0. As soon as the permissible extent of use for the determination method falls to 0, however, the electronic control system no longer determines the respective nominal current value and/or the respective control signals according to the determination method. Furthermore, the electronic control system reduces the permissible extent of use for the determination method at least from time to time. The permissible extent of use therefore defines whether or not the determination method can be used. For this reason the determination method is referred to as an enabled determination method.

As a result, the manufacturer of the frequency converter is always able to manufacture the frequency converter and in particular its electronic control system uniformly. Irrespective of the specific embodiment of the enabled determination method, the frequency converter therefore provides all the prerequisites from a hardware point of view in order to be able to carry out the enabled determination method. The need to consider the business interests also of the manufacturer is satisfied by the manufacturer only enabling specific functionalities and performance features, and thus as a result the determination method, in accordance with which the electronic control system determines the respective nominal current value and the respective control signals, to a limited extent (and for a fee) so that in particular the development performance and the know-how which is realized in the functionalities and performance features are subject to payment. The operator of the frequency converter is given the option of in essence customizing an individual product especially to his requirements and furthermore also individually adjusting the same to the changing requirements.

The permissible extent of use is independent of the current operating state of the frequency converter and the electric machine. The check to determine whether or not the permissible extent of use has the value 0, with the exception of the value of the permissible extent of use as such, is also independent of the current operating state of the frequency converter and the electric machine.

The permissible extent of use can in principle be set in any units. The decisive factor here is exclusively that the extent of use is quantified, so that it can gradually be reduced. Furthermore, the permissible extent of use corresponds to a permissible service life. The permissible service life can be use-independent. For instance, the permissible extent of use can be a use-independent period of time, for instance a number of days or weeks. Alternatively, it can be a use-dependent service life. For instance, the permissible extent of use can be a number of operating hours, in other words a use-dependent period of time. Similarly it can be a number of load cycles or clock cycles. In the case of a use-dependent service life, the reduction in the permissible service life can alternatively further be dependent on or independent of the operating state of the frequency converter and/or the electric machine. For instance, each operating hour can be weighted the same. In this case, the reduction in the permissible service life would not be dependent on the operating state of the frequency converter and/or the electric machine. Alternatively, the operating hours (or correspondingly smaller units) can be weighted with a power, for instance, which is fed from the converter to the electric machine. In this case, the reduction in the permissible service life would be dependent on the operating state of the frequency converter and/or the electric machine.

It is possible for the electronic control system to always output a corresponding notification when the permissible extent of use reaches a lower limit value above 0. As a result, the option is available to the operator of the frequency converter to increase the permissible extent of use promptly before reaching a permissible extent of use of 0. The interest of the operator of the frequency converter is thus preserved so that he can operate the frequency converter at any time.

In some instances it is even possible to parameterize the electronic control system so that it automatically makes such a request for an increase in the permissible extent of use. In this case, the operating method is configured so that when the permissible extent of use reaches the lower limit value the electronic control system always checks whether it is authorized to independently retrieve an expansion of the permissible extent of use. In case of affirmation, the electronic control system retrieves the expansion of the permissible extent of use by way of a computer-computer link from a server. If not, it outputs a corresponding notification.

The cited procedure, at least as a general rule, ensures that the permissible extent of use does not fall to 0. If this is the case, however, then there are various options.

On the one hand, it is possible for the electronic control system no longer to determine the respective nominal current value and the respective control signals whenever the permissible extent of use for the enabled determination method falls to 0. The frequency converter is therefore decommissioned, as it were. On the other hand, whenever the permissible extent of use for the enabled determination method falls to 0, it is possible that although the electronic control system continues to determine the respective nominal current value and the respective control signals, it determines the respective nominal current value and/or the respective control signals according to a basic method which differs from the enabled determination method. The frequency converter therefore transitions into a type of basic operation, as it were.

The basic method differs from the enabled determination method by means of at least one of the following properties:

A clock cycle, with which the basic method is carried out, is greater than a clock cycle with which the enabled determination method is carried out. For instance, the basic method can operate with a clock cycle of 500 µs, while the enabled determination method operates with a clock cycle of 125 µs.

Within the scope of the enabled determination method, the electronic control system also receives, in addition to the respective nominal base value, in each case an actual base value and considers it when the respective nominal current value is determined, does not receive the respective actual base value within the scope of the basic method however or does not consider it within the scope of the basic method when the respective nominal current value is determined. In one instance an open loop control takes place and in the other instance just a closed loop control.

A step response, with which the electronic control system responds to a change from nominal base value to nominal base value when the nominal current values are determined, is different in the basic method than in the enabled determination method. Changes of this type can be brought about for instance in the case of a closed-loop control by the type of controller (P-controller, PI-controller, PT1-controller etc.) and its parameterization (for instance with a PI controller proportional amplification and reset time).

The type of nominal base value is different within the scope of the basic method to within the scope of the enabled determination method. For instance, within the scope of the basic method, a position control can always take place, i.e. the nominal base value can be a nominal position value, while within the scope of the enabled determination method it can be parameterized to determine whether the nominal base value is a nominal position value, a nominal speed value or a nominal current value.

In many cases, when the respective control signals are determined, the frequency converter considers a position of a movable component of the electric machine, for instance the rotational position of the rotor of a rotational electric machine. It is possible for the position to be detected by means of a position encoder and transmitted to the electronic control system when the control signals are determined according to the enabled determination method, while in the basic method it is determined without a encoder by the electronic control system.

In many cases when the respective nominal current value and/or the of the respective control signals are determined, the electronic control system considers sensor signals from the surroundings of the frequency converter and/or from the surroundings of the electric machine. As a result, the electronic control system can respond to a thermal overload, for instance. It is possible for the electronic control system to consider the sensor signals within the scope of the basic method in a different way to within the scope of the enabled determination method. Normally (with the basic method), the electronic control system will operate the frequency converter so that the hardware components of the frequency converter, in particular the power semiconductors, are protected against a thermal overload. In some application cases, for instance when the electric machine operates a fan, by means of which a tunnel is ventilated for motor vehicles or rail vehicles, for superior safety reasons however the frequency converter must be able to continue to operate "to the bitter end", even though it is thermally overloaded (enabled determination method). This is because it is more important, in the event of a fire for instance, to draw smoke out of the tunnel for as long as possible and to save lives than to keep the frequency converter functional.

The electronic control system determines the respective nominal current value and/or the respective control signals within the scope of the basic method and the enabled determination method so that within the scope of the basic method a power supplied to the electric machine is limited to a lower value than within the scope of the enabled determination method. In other words, without enabling the determination method, the frequency converter can only be operated with a power of x kW, while when the determination method is enabled it can be operated with y kW, wherein y is greater than x.

It is possible to enable only individual properties of the determination method by means of a respective enable code. However, properties of the determination method are preferably combined to form prefabricated groups which are enabled by means of a uniform enable code.

The enable code can be transmitted to the control device in, in principle, any manner. In particular, it is possible to transmit the enable code in an app. It is also possible to define the prefabricated groups by means of an app so that the user is able to define the respective group by directly selecting the app or selecting within the app.

It is possible for algorithms and/or parameters required to carry out the enabled determination method to be stored permanently in the electronic control system. In this case, the determination method is enabled by the electronic control system receiving an enable code. This embodiment has the advantage that data only has to be transmitted to the electronic control system to a minimal extent. It is even possible for the data to be entered manually by way of a control panel. Alternatively, it is possible for the determination method to be enabled by the electronic control system receiving the algorithms and/or parameters required to carry out the enabled determination method together with an enable code. In this case, data traffic is required to a large extent. Conversely, this embodiment has the advantage, however, that the electronic control system has a lower storage requirement. Furthermore the algorithms and parameters only supply an attack point for hackers during the period of time during which they are stored in the electronic control system. With permanent storage in the electronic control system, this attack point is conversely permanently provided.

In the case of also loading the algorithms and/or parameters, it is possible in particular for these to be loaded by way of a cloud computer, for instance.

The object is further achieved by a control program the as set forth hereinafter. In accordance with the invention, the processing of the machine code by the electronic control system causes the electronic control system to carry out an inventive operating method.

The object is further achieved in accordance with the invention by an electronic control system of a frequency converter, wherein the electronic control system is programmed with an inventive control program so that the processing of the machine code by the electronic control system causes the electronic control system to carry out an inventive operating method.

The object is further achieved by a frequency converter as set forth hereinafter. In accordance with the invention, the electronic control system, which actuates the semiconductor switches, is embodied as an inventive electronic control system.

BRIEF DESCRIPTION OF THE DRAWING

The afore-described properties, features and advantages of this invention as well as the manner in which these are achieved will become clearer and more intelligible in conjunction with the following description of the exemplary embodiments, which are explained in more detail in conjunction with the drawings. Here the drawings show schematically.

DETAILED DESCRIPTION OF PREFERRED EMBODIMENTS

Figure 1:
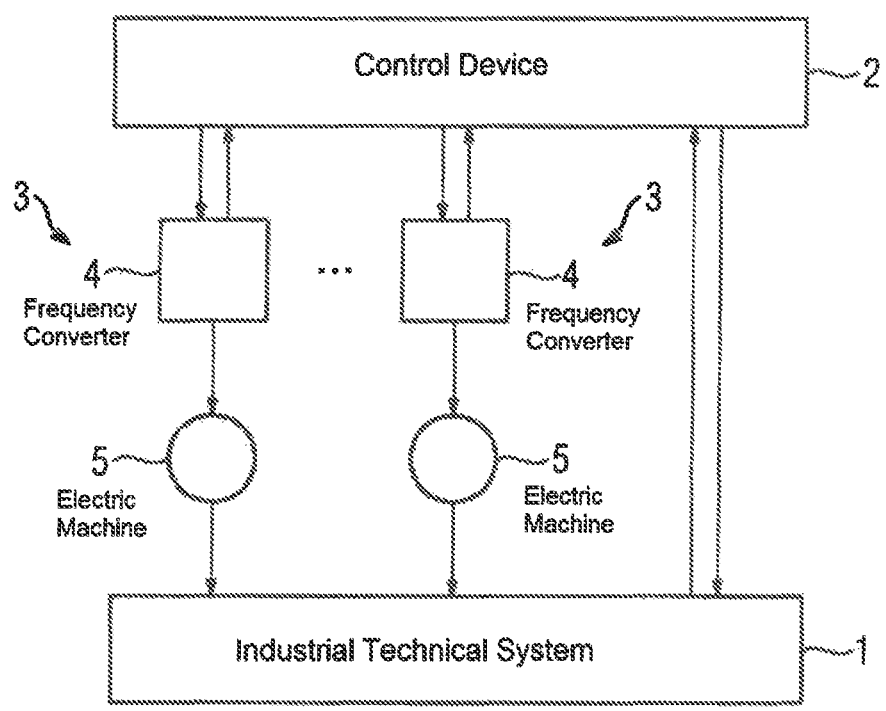
FIG. 1 a machine,
FIG. 2 a drive, and
FIGs. 3 to 7 flow charts.

According to FIG. 1, an industrial technical system 1 is controlled by a control device 2. Depending on the system 1 and on the control task to be realized, the control device 2 can be, for instance, a computer numeric control (CNC), a motion control (MC), or a programmable logic control (PLC). A number of drives 3 is generally controlled inter alia by the control device 2. The drives 3 comprise in each case a frequency converter 4 and an electric machine 5. Representative of all frequency converters 4, the design of one of the frequency converters 2, in conjunction with FIG. 2, and then the mode of operation of the frequency converter 4, initially in conjunction with FIG, are explained in more detail below.

Figure 2:
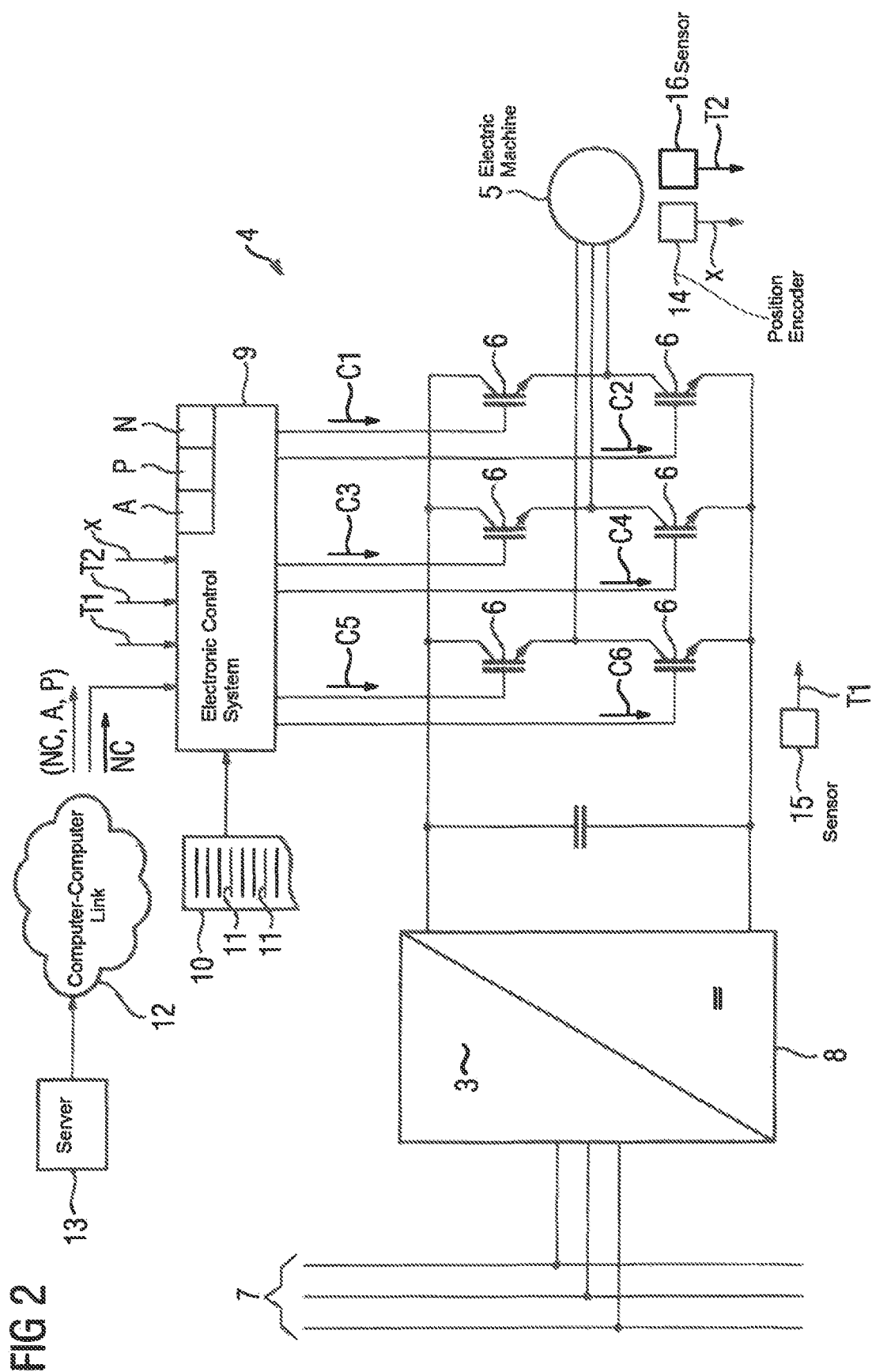

According to FIG. 2, the frequency converter 4 has power semiconductors 6. According to the representation in FIG. 2 the power semiconductors 6 can be embodied as IGBTs. An embodiment as a MOSFET or as thyristors, in particular as GTOs, is also possible. The power semiconductors 6 themselves are only shown in FIG. 2. As a rule, freewheeling diodes are generally additionally connected in parallel with the power semiconductors 6. The freewheeling diodes are not shown.

The corresponding electric machine 5 is supplied with electrical energy by way of the power semiconductors 6. In particular, the electrical energy is generally obtained from a mains power supply 7, wherein the electrical energy is rectified by means of a rectifier 8 before being supplied to the power semiconductors 6. Depending on the individual circumstances, the rectifier 8 can be embodied as a regenerative converter or as a simple diode rectifier.

To control the respective power semiconductors 6 and thus the respective drive 3, the frequency converter 4 has an electronic control system 9. The electronic control system 9 therefore actuates the power semiconductors 6. In particular, the electronic control system 9 feeds corresponding control signals C1 to C6 to the power semiconductors 6. The electronic control system 9 is programmed using a control program 10. The control program 10 comprises machine code 11 which can be processed by the electronic control system 9. The processing of the machine code 11 by the electronic control system 9 causes the electronic control system 9 to operate the frequency converter 4 according to an operating method, which is explained in more detail below in conjunction with the further FIGs.

Figure 3:
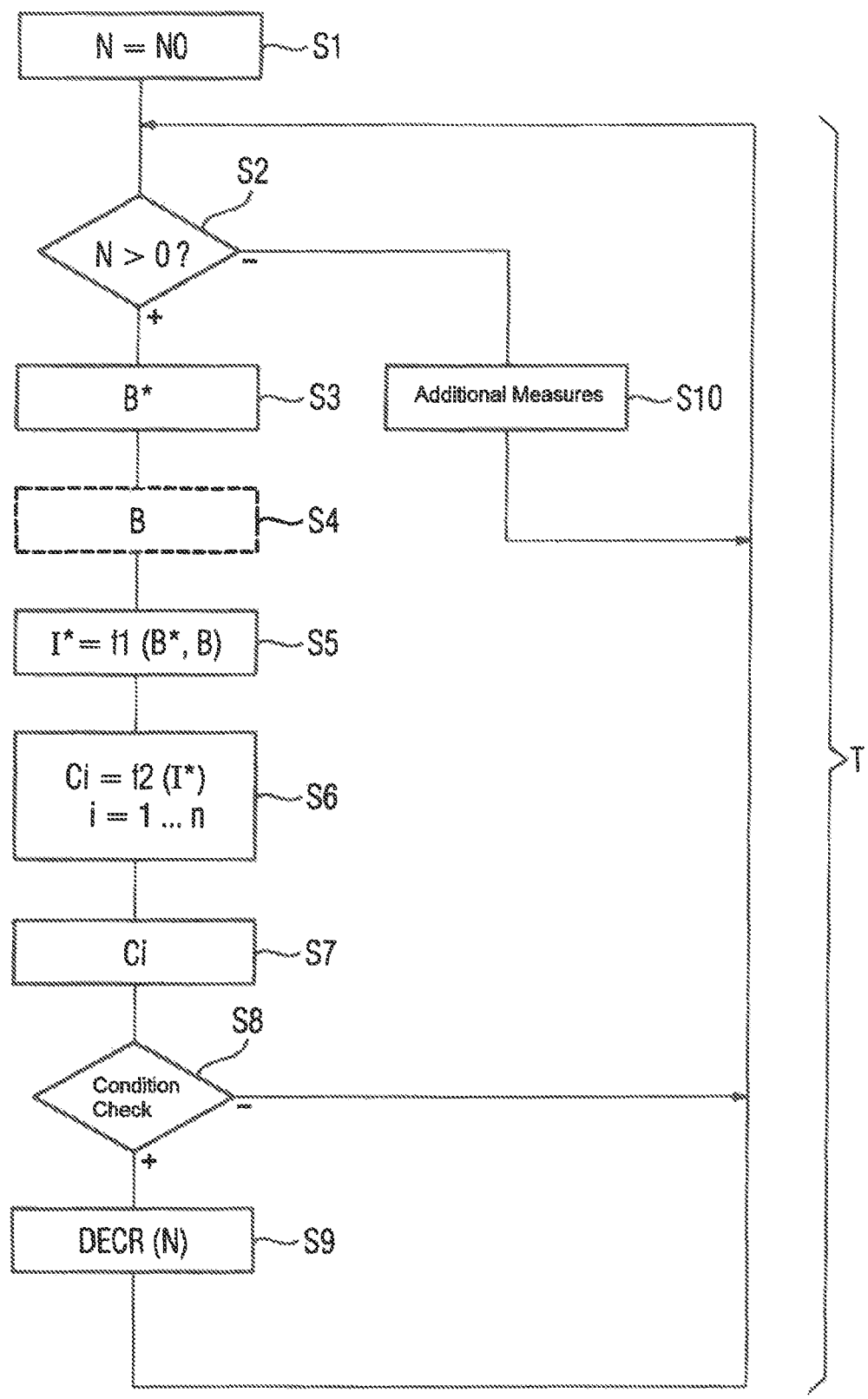

Within the scope of the inventive operating method, in step S1 of FIG. 3 the electronic control system 9 firstly sets a permissible extent of use N to an initial value NO. The initial value NO is greater than 0. The permissible extent of use N can be predetermined for instance as a use-independent duration, as a number of operating hours, as a number of load cycles etc.

In step S2, the electronic control system 9 checks whether the permissible extent of use N has a value greater than 0. If this is the case, the electronic control system 9 transitions to step S3. In step S3, the electronic control system 9 receives a nominal base value B*. The nominal base value B* describes a nominal operating state of the electric machine 5, for instance with a conventional rotational electric machine, its position, its speed or its torque. With a linear drive, the speed and/or the torque would possibly be replaced by the speed and/or the force.

In step S4, the electronic control system 9 can further receive an associated actual base value B from the electric machine 5, which characterizes the associated actual operating state of the electric machine 5. The step S4 is however only optional and therefore only shown with dashed lines in FIG. 3.

In step S5, the electronic control system 9 determines a nominal current value I* for the electric machine 5. The determination is carried out according to the representation in FIG. 5 using the nominal base value B*. If the actual base value B is also available, the actual base value B is generally also used. The determination of step S5 is carried out according to a first part f1 of a determination method. In step S6 the electronic control system 9 then determines the control signals C1 to C6 for the power semiconductors 6. The determination is carried out according to the representation in FIG. 3 using the nominal current value I*. The determination of step S6 is further carried out according to a second part f2 of the determination method. Both the determination of the nominal current value I* and also the determination of the control signals C1 to C6 which builds thereupon take place so that the electric machine 5 is operated as far as possible according to the nominal base value B*. In step S7, the electronic control system 9 then actuates the power semiconductors 6 according to the determined respective control signals C1 to C6. As a result, the electric machine 5 is supplied accordingly with electrical energy.

In step S8, the electronic control system 9 checks whether a condition for reducing the permissible extent of use N is met. If this is the case, in step S9 the electronic control system 9 reduces the permissible extent of use N. Otherwise step S9 is missed out. In both cases the electronic control system 9 then transitions back to step S2.

According to the representation in FIG. 3, steps S2 to S9 are carried out repeatedly by the electronic control system 9 with a clock cycle T. The clock cycle T has a value which lies in the single-digit millisecond range or below, for instance at 2 ms, 1 ms, 500 µs, 250 µs or 125 µs.

The procedure explained above therefore ensures that the electronic control system 9 determines the respective nominal current value I* and the respective control signals C1 to C6 according to the determination method defined by the parts f1 and f2, if and as long as the permissible extent of use N is greater than 0. As soon as the permissible extent of use N falls to 0, the determination method defined by parts f1 and f2 is conversely no longer carried out. In this case, the electronic control system 9 therefore sets the determination of the nominal current value I* and the control signals C1 to C6 according to the determination method defined by parts f1 and f2. Therefore in this case the electronic control system 9 no longer determines the nominal current value I* and the control signals C1 to C6 according to the determination method defined by parts f1 and f2. Instead, the electronic control system 9 carries out a step S10, in which it takes additional measures. The determination according to the determination method defined by the parts f1 and f2 is therefore only activated as long as the permissible extent of use N is greater than 0.

In order to prevent the permissible extent of use N from falling to 0, various embodiments are possible. In particular, it is possible to extend the method in FIG. 3 alternatively according to the procedure in FIG. 4 or according to the procedure in FIG. 5.

Figure 4:
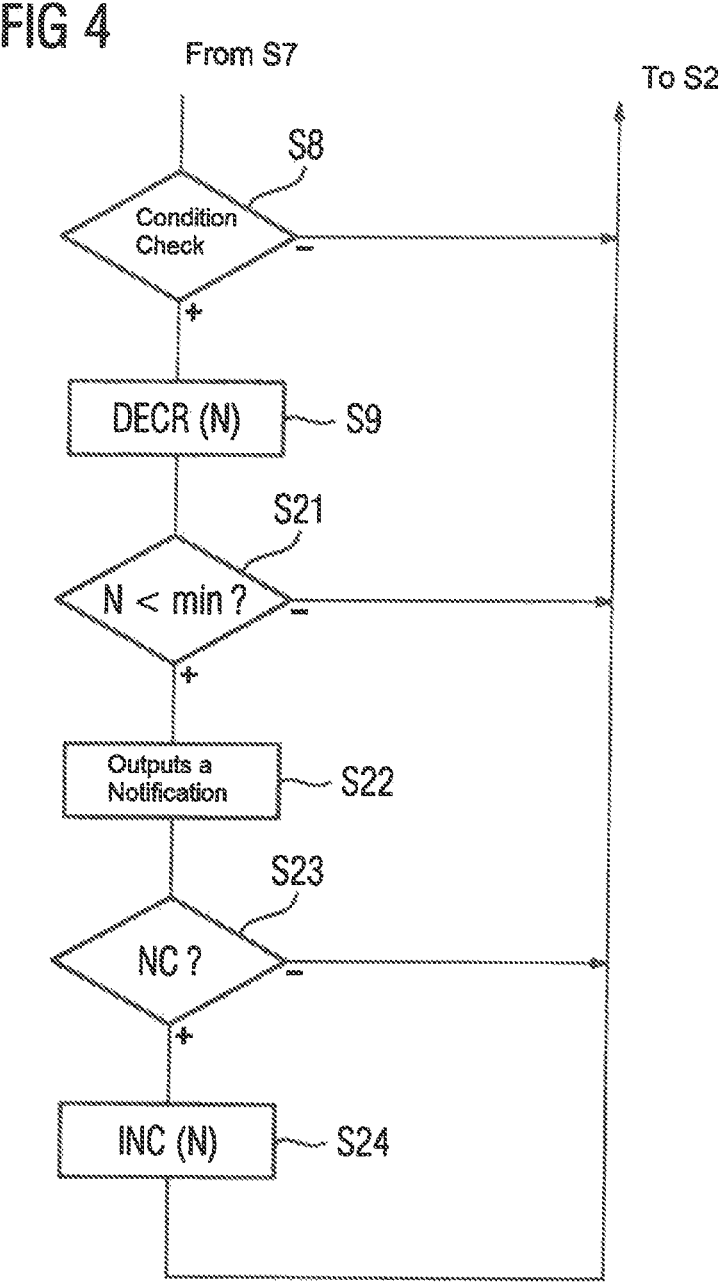

Within the scope of the procedure in FIG. 4, a step S21 follows on from step S9. In step S21, the electronic control system 9 checks whether the permissible extent of use N reaches a lower limit value. The lower limit value min has a value above 0. As long as the permissible extent of use N remains above the lower limit value min, the electronic control system 9 transitions from step S21 back to step S2. Otherwise in step S22 the electronic control system 9 outputs a notification. The notification can be transmitted for instance via a human-machine interface to a user of the system 1, to a higher-order control device, for instance the control device 2, or generally to another computer. On account of the notification, it is therefore possible to increase the permissible extent of use N by specifying a corresponding enable code NC. In step S23 the electronic control system 9 therefore checks whether an enable code NC of this type is predetermined thereto. If this is the case, in step S24 the electronic control system 9 increases the permissible extent of use N accordingly.

Figure 5:
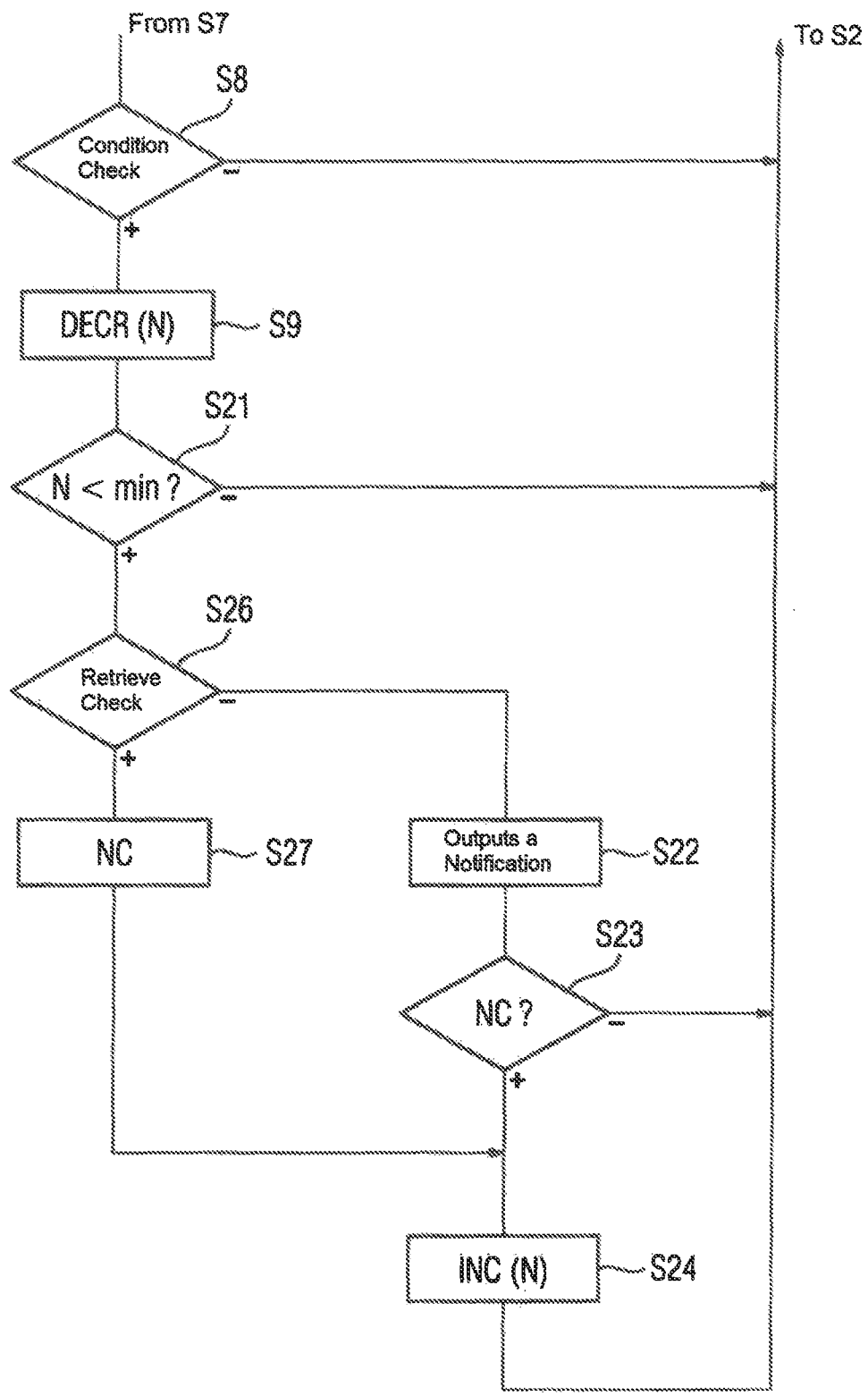

Within the scope of the procedure in FIG. 5, the steps S21 and S24 are likewise present. In addition, steps S26 and S27 are present, however. In step S26, the electronic control system 9 checks whether it is authorized to independently retrieve an expansion of the permissible extent of use N. If this is the case, in step S27, see also FIG. 2, the electronic control system 9 retrieves the expansion of the permissible extent of use N from a server 13 by way of a computer-computer link 12. In particular, it can request the enable code NC independently. Otherwise, if the electronic control system 9 is therefore not authorized to independently retrieve an expansion of the permissible extent of use N, the electronic control system 9 transitions to step S22 and from there to steps S23 and S24.

There are likewise various possibilities for the embodiment of step S10.

Figure 6:
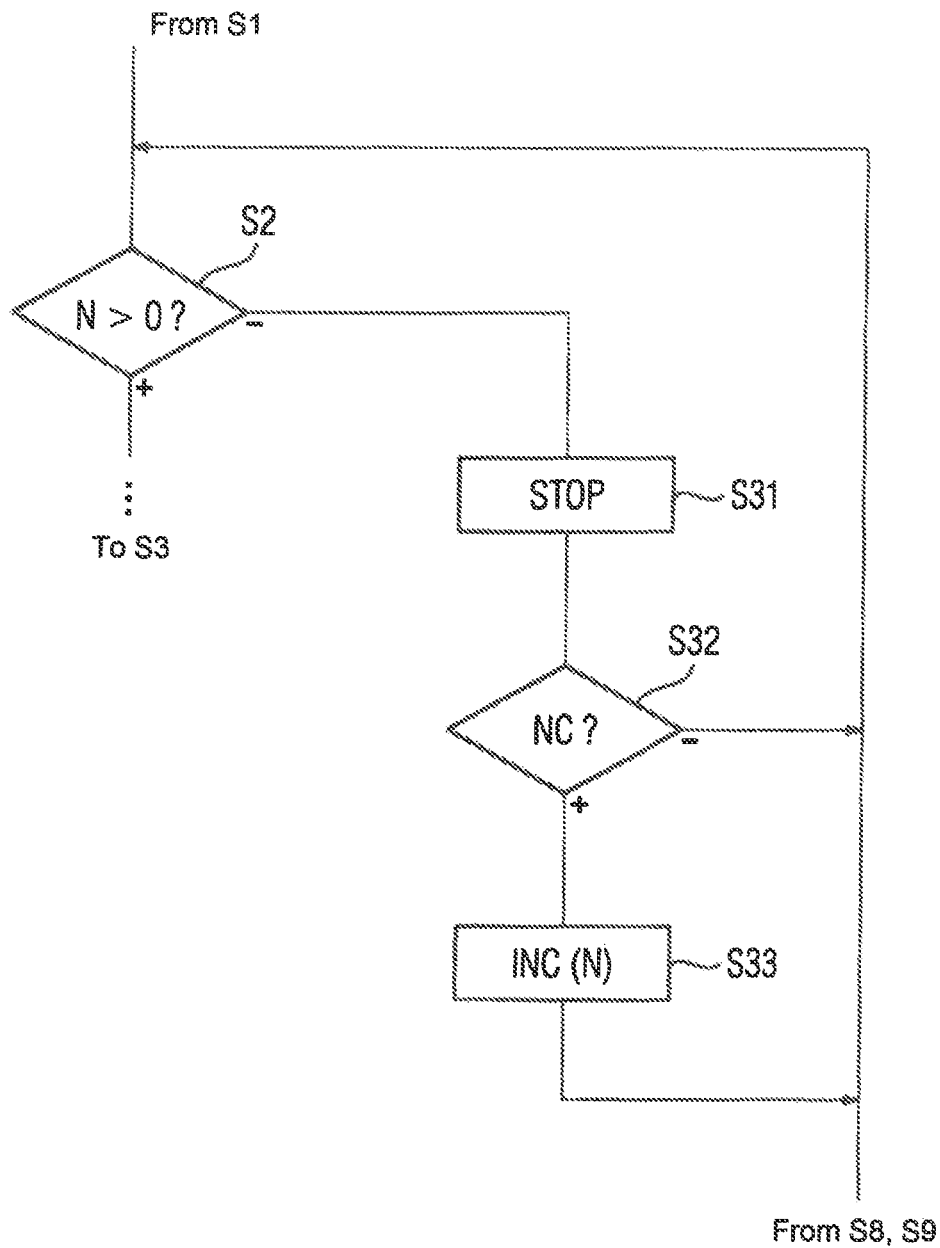

For instance, according to the representation in FIG. 6, it is possible for step S10 to be implemented by steps S31 to S33. In step S31, the electronic control system 9 sets the determination of the respective nominal current value I* and the respective control signals C1 to C6 completely. It therefore no longer determines the respective nominal current value I* and the respective control signals C1 to C6. Then in step S32 it waits for the enable code NC to be predetermined to it. If this is the case, in step S33 the electronic control system 9 increases the permissible extent of use N accordingly. Steps S32 and S33 correspond in terms of content to steps S23 and S24 in FIGS. 4 and 5.

Figure 7:
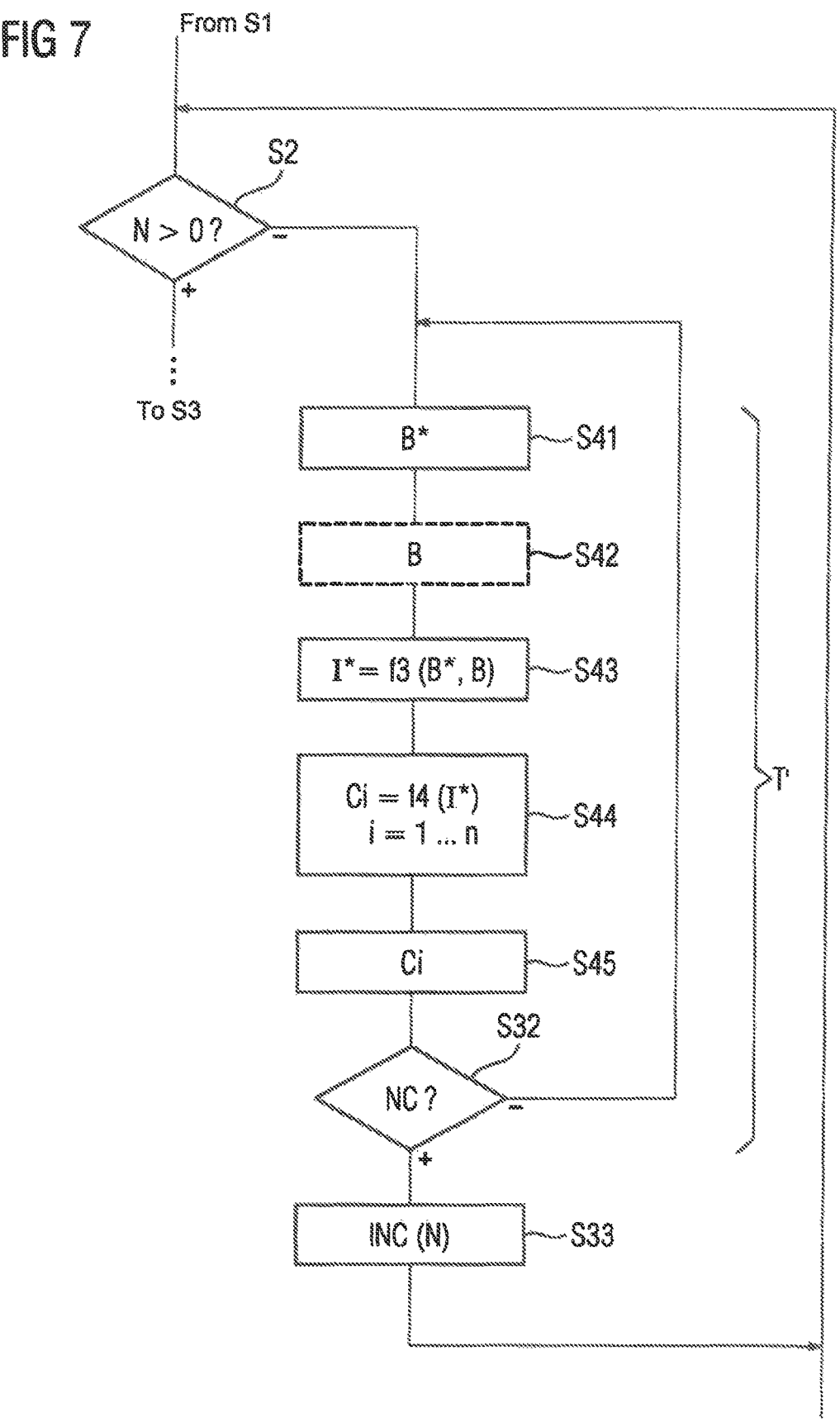

Alternatively, according to the representation in FIG. 7, it is possible for steps S41 to S45 to be present instead of step S31.

In step S41, the electronic control system 9 receives the nominal base value B*. In step S42, the electronic control system 9 can further receive an associated actual base value B of the electric machine 5. Step S42 is however only optional and therefore only shown with a dashed line in FIG. 7. In step S43, the electronic control system 9 determines the nominal current value I* for the electric machine 5. In step S44, the electronic control system 9 determines the control signals C1 to C6 for the power semiconductors 6. In step S45, the electronic control system then actuates the power semiconductors 6 according to the determined respective control signals C1 to C6.

Step S41 to S45 therefore correspond in terms of approach to steps S3 to S7 in FIG. 3. Step S43 differs from step 35 in that within the scope of step S43, the determination of the nominal current value I* is not carried out according to the first part f1 of the determination method, but instead according to a first part f3 of a basic method, Alternatively or in addition, step S44 differs from step S6 in that within the scope of step S44 the control signals C1 to C6 are not determined according to the second part f2 of the determination method, but instead according to a second part f4 of the basic method.

The basic method in steps S43 and S44 is a different method to the determination method in steps S5 and S6. A nominal current value I* is therefore determined, and the control signals C1 to C6 are also determined. The nominal current value I* in step S43 has however, with the same input variables, a different value to the nominal current value I* in step S5. Alternatively or in addition, the control signals C1 to C6 in step S44, with the same input variables, have different values to the control signals C1 to C6 in step S6.

The basic method in steps S43 and S44 can differ from the determination method S5 and S6 as a result of different properties.

For instance, it is possible for a clock cycle T', with which the basic method is carried out, to be greater than the clock cycle T, with which the determination method is carried out. For instance, the clock cycle T' can equate to twice or four-times the clock cycle T. If, purely by way of example, the clock cycle T amounts to 1 ms, the clock cycle T' could therefore amount to 2 ms or 4 ms, for instance.

Alternatively or in addition, it is possible, within the scope of the determination method, for the electronic control system 9, in addition to the nominal base value B*, to also receive the actual base value B and to consider the same when the respective nominal current value I* is determined, while within the scope of the basic method the electronic control system 9 does not receive the actual base value B or does not consider the same when the respective nominal current value I* is determined. It can therefore be such, for instance, that although step S4 is present, step S42 is not.

Alternatively or in addition, it is possible for a step response, with which the electronic control system 9 responds to a change from the nominal base value B* to nominal base value B* when the nominal current values I* are determined, to differ in the basic method from in the determination method. For instance, within the scope of step S5, the first part f1 of the determination method can realize a specific type of controller (for instance a PI controller), while within the scope of step S43, the first part f3 of the basic method realizes a different type of controller (for instance a P controller). The controller characteristics can also differ, even with the same type of controller, for instance with a PI controller the proportional amplifications and/or the reset times within the scope of the determination method and the basic method have values which differ from one another. It is also possible within the scope of the basic method for the type of controller and/or its controller parameter to be fixedly predetermined, while within the scope of the determination method they can be set by the user. Other variations are also possible.

Alternatively or in addition, it is possible for the type of nominal base value B* within the scope of the basic method to differ from that within the scope of the determination method. By way of example, it is possible for there to always be a nominal position value within the scope of the basic method of the nominal base value B*, while within the scope of the determination method the nominal base value B* is always a nominal speed value or can be set by the user, whether it is a nominal position value, a nominal speed value or a nominal instant value.

To determine the control signals C1 to C6 with a given nominal current value I*, a position x of a movable component of the electric machine 5 is often considered, for instance with a rotational electric machine a rotational position of the rotor. In this regard it is in principle possible to detect the rotational position of the rotor or generally the position x of the movable component by means of a corresponding position encoder 14 as a measured value and to make it available to the electronic control system 9. Alternatively, it is possible (and generally known to persons skilled in the art) to determine the rotational position of the rotor or generally the position x of the movable component in an encoderless manner. It is possible, alternatively or in addition to the embodiments cited above, when determining the control signals C1 to C6 according to the determination method, to detect the position x by means of the position encoder 14 and to transmit it to the electronic control system 9, while with the basic method it is determined in an encoderless manner by the electronic control system 9.

Alternatively or in addition, it is possible for the electronic control system 9 to consider sensor signals T1, T2 from the surroundings of the frequency converter 4 and/or from the surroundings of the electric machine 5 when determining the nominal current value I* and/or determining the control signals C1 to C6. In this case, it is possible for the methods of consideration within the scope of the basic method to differ from those within the scope of the determination method. For instance, corresponding sensors 15, 16 can be used to detect a temperature T1 in the surroundings of the frequency converter 4 and/or a temperature T2 in the surroundings of the electric machine 5 and to feed it to the frequency converter 4. Within the scope of the determination method, it is possible to parameterize whether the electronic control system 9 furthermore actuates the power semiconductors 9 or whether it sets the actuation when limit values are exceeded by the temperatures T1, T2. Within the scope of the operating method, it can be fixedly preset that the electronic control system 9 sets the actuation of the power semiconductors 9 when the limit values are exceeded by the temperatures T1, T2.

Alternatively or in addition, it is possible for the determination of the nominal current value I* and/or the control signals C1 to C6 to take place within the scope of the basic method, so that a power fed to the electric machine 5 is restricted to a relatively low value of 3 kW, for instance, while within the scope of the determination method the determination of the nominal current value I* and/or the control signals C1 to C6 is carried out so that the power fed to the electric machine 5 is limited to a higher value of 10 kW, for instance.

To carry out the determination method, specific algorithms A and/or parameters P must be available to the electronic control system 9. At the point in time of executing the determination method, according to the representation in FIG. 2, both the algorithms A and/or the parameters P must therefore be stored in the electronic control system 9. It is possible for the algorithms A and/or parameters P to be stored permanently in the electronic control system 9. In this case, the determination method is enabled by the electronic control system 9 receiving the enable code NC. This is indicated in FIG. 2 in that it is possible to exclusively transmit the enable code NC to the electronic control system 9. Alternatively it is possible for the algorithms A and/or parameters P to only be stored temporarily in the electronic control system 9, In this case, the determination method is enabled in that not only the enable code NC, but together with the enable code NC also the required algorithms A and/or parameters P are transmitted to the electronic control system 9. This is indicated in FIG. 2 in that the enable code NC, the algorithms A and/or the parameters P are transmitted together to the electronic control system 9.

In summary, the present invention therefore relates to the following facts:

An electronic control system 9 of a frequency converter 4 repeatedly receives in each case a nominal base value B* for the operation of an electric machine 5 supplied with electrical energy by way of the frequency converter 4, determines a respective nominal current value I* by using the respective nominal base value B* and determines respective control signals C1 to C6 for power semiconductors 6 of the frequency converter 4 by using the respective nominal current value I*. It actuates the power semiconductors 6 according to the determined respective control signals C1 to C6 and as a result supplies electrical energy to the electric machine 5 so that the electric machine 5 is operated as much as possible according to the nominal base value B*. The electronic control system 9 determines the respective nominal current value I* and/or the respective control signals C1 to C6 according to an enabled determination method, if and as long as a permissible extent of use N for the enabled determination method is greater than 0. If, by contrast, the permissible extent of use N for the enabled determination method falls to 0, the electronic control system 9 no longer determines the respective nominal current value I* and/or the respective control signals C1 to C6 according to the enabled determination method. The electronic control system 9 reduces the permissible extent of use N for the enabled determination method at least from time to time.

The present invention has many advantages. For the manufacturer of the frequency converter 4, the type of diversity reduces and accordingly in particular the logistics simplify. The user of the frequency converter 4 gains flexibility. This is then particularly significant if the requirements on the frequency converter 4 subsequently change. As a result, the user can furthermore initially require a first functionality, for instance, and at a subsequent point in time, be it in addition to the first functionality, be it alternatively to the first functionality, a second functionality. This is naturally also possible with more than two functionalities.

Although the invention has been illustrated and described in more detail by the preferred exemplary embodiment, the invention is therefore not restricted by the disclosed examples and other variations can be derived herefrom by the person skilled in the art without departing from the scope of protection of the invention.

What is claimed is:

1. An operating method for a frequency converter comprising:
setting a use value of the frequency converter to an initial value greater than zero:
repeatedly receiving at an electronic control system of the frequency converter one nominal base value at a time for operation of an electric machine supplied with electrical energy via the frequency converter;
determining with the electronic control system a respective nominal current value using a respective nominal base value;
determining with the electronic control system respective control signals for power semiconductors of the frequency converter using the respective nominal base value;
actuating with the electronic control system the power semiconductors according to the determined respective control signals;
supplying the electric machine with electrical energy so that the electric machine is operated as much as possible according to the nominal base value;
enabling a determination method if and as long as the use value is greater than zero:
determining with the electronic control system the respective nominal current value and/or the respective control signals according to the enabled determination method;
no longer determining with the electronic control system the respective nominal current value and/or the respective control signals according to the enabled determination method as soon as the use value falls to 0; and reducing with the electronic control system at least from time to time the use value.

2. The operating of claim 1 further comprising always outputting with the electronic control system a corresponding notification when the of use value reaches a lower limit value above 0.

3. The operating of claim 1 further comprising:
always checking with the electronic control system, when the of use value reaches a lower limit value above 0, whether the electronic control system is authorized to independently retrieve an expansion of the use value; and
in a case of affirmation, the electronic control system retrieves the expansion of the use value from a server via a computer-computer link; and
if not, the electronic control system outputs a corresponding notification.

4. The operating method of claim 1 further comprising actually no longer determining with the electronic control system the respective nominal current value and the respective control signals whenever the use value falls to 0.

5. The operating method of claim 1 further comprising although continuing to determine the respective nominal current value and the respective control signals whenever the use value falls to 0, the electronic control system determines the respective nominal current value and/or the respective control signals according to a basic method which differs from the enabled determination method.

6. The operating method of claim 5, wherein the basic method differs from the enabled determination method by at least one of the following properties:
a dock cycle with which the basic method is carried out is greater than a dock cycle with which the enabled determination method is carried out;
within a scope of the enabled determination method, the electronic control system receives, in addition to the respective nominal base value, in each case also an actual base value and considers the actual base value when the respective nominal current value is determined, however does not receive a respective actual base value within a scope of the basic method or does not consider the actual base value within the scope of the basic method when the respective nominal current value is determined;
a step response with which the electronic control system responds to a change from nominal base value to nominal base value when the nominal current values are determined is different in the basic method than in the enabled determination method;
a type of nominal base value is different within the scope of the basic method to within the scope of the enabled determination method;
when the respective control signals are determined, a position of a movable component of the electric machine is considered and when the control signals are determined according to the enabled determination method, the position is detected via a position encoder and transmitted to the electronic control system, while in the basic method the position is determined without an encoder by the electronic control system;
when the respective nominal current value and/or the of the respective control signals are determined, the electronic control system considers sensor signals from surroundings of the frequency converter and/or from surroundings of the electric machine and the electronic control system considers the sensor signals within the scope of the basic method in a different way to within the scope of the enabled determination method; and
the electronic control system determines the respective nominal current value and/or the respective control signals within the scope of the basic method and the enabled determination method so that within the scope of the basic method a power supplied to the electric machine is limited to a lower value than within the scope of the enabled determination method.

7. The operating method of claim 1 further comprising storing permanently algorithms and/or parameters required to carry out the enabled determination method in the electronic control system and enabling the determination method by the electronic control system accepting an enable code, or enabling the determination method by the electronic control system accepting the algorithms and/or parameters required to carry out the enabled determination method together with an enable code.

8. The operating method of claim 7 further comprising combining properties of the determination method to form prefabricated groups which are enabled via a uniform enable code.

9. The operating method of claim 8 further comprising defining the prefabricated groups via an app, so that a user is able to set a respective group by directly selecting the app or selecting within the app.

10. The operating method of claim 7 further comprising transmitting the enable code of the electronic control system in an app.

11. The operating method of claim 7, wherein in a case of loading also the algorithms and/or parameters, the algorithms and/or parameters are loaded by way of a cloud computer.

12. A computer program product, comprising a control program embodied in a non-transitory computer readable storage medium, for an electronic control system of a frequency converter, wherein the control program comprises machine code which can be processed by the electronic control system, wherein the processing of the machine code by the electronic control system causes the electronic control system to:
set a use value of the frequency converter to an initial, value greater than zero;
repeatedly receive at the electronic control system of the frequency converter one nominal base value at a time for operation of an electric machine supplied with electrical energy via the frequency converter;
determine with the electronic control system a respective nominal current value using a respective nominal base value;
determine with the electronic control system respective control signals for power semiconductors of the frequency converter using the respective nominal base value;
actuate with the electronic control system the power semiconductors according to the determined respective control signals;
supply the electric machine with electrical energy so that the electric machine is operated as much as possible according to the nominal base value;
enable a determination method if and as long as the use value is greater than zero;
determine with the electronic control system the respective nominal current value and/or the respective control signals according to the enabled determination method;
no longer determine with the electronic control system the respective nominal current value and/or the respective control signals according to the enabled determination method as soon as the use value falls to 0; and reduce with the electronic control system at least from time to time the use value.

13. A frequency converter comprising:

power semiconductors:

an electronic control system of the frequency converter actuating the power semiconductors of the frequency converter supplying electrical energy to an electric machine, said electronic control system programmed with a control program, wherein the control program comprises machine code which can be processed by the electronic control system, wherein the processing of the machine code by the electronic control system causes the electronic control system to:

set a use value of the frequency converter to an initial value greater than zero;

repeatedly receive at the electronic control system of the frequency converter one nominal base value at a time for operation of the electric machine supplied with the electrical energy via the frequency converter;

determine with the electronic control system a respective nominal current value using a respective nominal base value;

determine with the electronic control system respective control signals for the power semiconductors of the frequency converter using the respective nominal base value;

actuate with the electronic control system the power semiconductors according to the determined respective control signals;

supply the electric machine with electrical energy so that the electric machine is operated as much as possible according to the nominal base value;

determine with the electronic control system the respective nominal current value and/or the respective control signals according to an enabled determination method if and as long as the use value is greater than 0;

no longer determine with the electronic control system the respective nominal current value and/or the respective control signals according to the enabled determination method as soon as the use value falls to 0; and reduce with the electronic control system at least from time to time the use value.

* * * * *

UNITED STATES PATENT AND TRADEMARK OFFICE
CERTIFICATE OF CORRECTION

| | |
|---|---|
| PATENT NO. | : 11,404,975 B2 |
| APPLICATION NO. | : 17/262560 |
| DATED | : August 2, 2022 |
| INVENTOR(S) | : Tammo Krause-Leipoldt |

It is certified that error appears in the above-identified patent and that said Letters Patent is hereby corrected as shown below:

On the Title Page
Under (30) Foreign Application Priority Data:
Replace "EP 18185499" with -- EP 18185499.3 --.

In the Claims
In Column 13, Claim 2, Line 5:
Delete before "use" the word "of".

Signed and Sealed this
Twenty-eighth Day of February, 2023

Katherine Kelly Vidal
*Director of the United States Patent and Trademark Office*